3,324,004
COMPACT POWDER ANTIPERSPIRANT CONTAINING POLYOXYETHYLENE LAURYL ETHER
Jack B. Nagler, Stamford, Conn., assignor to Del Laboratories, Inc., a corporation of Delaware
No Drawing. Filed May 31, 1963, Ser. No. 284,389
7 Claims. (Cl. 167—90)

This invention relates to cosmetic preparations. More particularly, it is directed to antiperspirant toilet preparations, and even more particularly, to such preparations in compact powder form.

Antiperspirant toilet preparations have heretofore been provided in the form of ointments, creams, sticks and sprays. More recently, there has come into use antiperspirant toilet preparations in dry form, i.e., in the form of a compact powder.

As is well known, antiperspirant activity is provided by metallic salts, the principal salts being those of aluminum. The art is familiar with the various aluminum salts employed for this purpose. The one most widely used is an aluminum chlorohydroxide complex, sometimes referred to as aluminum chlorohydrol.

The dry antiperspirants are basically compact powders, i.e., face powders having a substantial content of the antiperspirant component. Compact powders, as is well known, are primarily face powders containing a sufficient amount of oil or oleaginous material to bind the powder.

Fundamentally, a compact powder is made by introducing a small amount of mineral oil (of the order of 3 or 4%), by spraying into the powder, following which the oiled powder is pulverized and compressed. The basic components of a face powder are generally talc, some titanium dioxide, optionally some kaolin, and a non-alkali metal soap, such as zinc stearate or calcium stearate, etc., a tinctorial agent (this may be an iron oxide pigment) and, if desired, a perfume oil.

As has just been mentioned, compressed powder antiperspirants are compact face powders containing a substantial amount of an antiperspirant. It has been found that antiperspirant metallic salts are hygroscopic. As a consequence, these dry antiperspirants have a tendency to absorb water with resultant swelling and even crumbling or disintegration.

I have found that it is possible to suppress the hygroscopicity of such dry antiperspirants by the inclusion of a lauryl alcohol polyoxyethylene ether. The incorporation of the mentioned ether within the dry antiperspirant provides a product of excellent physical stability. The mentioned ether is obtainable by condensing lauryl alcohol with 4 mols of ethylene oxide. Accordingly, its chemical constitutions is: $C_{12}H_{25}O(CH_2CH_2O)_4OH$. It is available commercially as "Brij 30," a product of Atlas Chemical Industries.

The following are examples of my novel dry antiperspirants:

*Example 1*

The customary components of a face powder, supplemented by the inclusion of aluminum chlorohydroxide complex are blended together in conventional fashion. Such a blend of dry ingredients is composed of:

| | Grams |
|---|---|
| Talc | 670 |
| Titanium dioxide | 22 |
| Zinc stearate | 35 |
| Iron oxide (cosmetic grade) | 18 |
| Aluminum chlorohydroxide complex | 160 |

A liquid mixture is formed from 47 grams of mineral oil; 18 grams of water; and 30 grams of "Brij 30."

The liquid mixture is introduced, as by spraying, into the blend of the dry components during the commingling thereof until all of the liquid becomes absorbed by the dry material. When the absorption is completed, the contents of the mixer are pulverized. This pulverized material is then compressed to form the compact powder antiperspirant. Conventional compressing equipment and procedure used in making compact face powder are employed.

The product of this example can be scented. In such case, a sufficient amount of perfume oil to impart the desired scent is included in the liquid mixture.

*Example 2*

A compact antiperspirant powder is manufactured as described in Example 1, except that 20–50 grams of kaolin (cosmetic grade) replaces an equal amount of the talc.

*Example 3*

A compact antiperspirant is manufactured in accordance with the procedures described in Examples 1 and 2, except that there is also included among the dry components, about ⅛ to ¼% (weight basis of final product) of hexachlorophene or an equivalent bactericidal substance.

It will be understood that the foregoing formulations are merely illustrative of the products of this invention. The proportions of the dry components may be varied to the extent well known in the compact face powder art. See, for example, "Cosmetics Science & Technology," edited by Edward Sagarin, Interscience Publishers, Inc., New York, (1957); more particularly therein, "Face Powders" by Jean R. L. Martin at pages 222–248, and "Foundation Makeup" by J. George Fiedler at pages 262–270.

The antiperspirant agent, both as to its chemical constitution and amount, can likewise be varied. Any cosmetically acceptable or suitable antiperspirant may be used. See "Cosmetic Science & Technology," supra; more particularly, "Antiperspirants and Deodorants" by Sophie L. Plechner at pages 717–739.

An aluminum compound should be present in an amount of 10–25%, preferably 15 to 20% by weight of the finished product. The "Brij 30" may be present in an amount of 1.5 to 5%, preferably in an amount of about 2.5 to 3.5%.

As for the hexachlorophene or its equivalent, the amount thereof may be varied within the range customarily present in cosmetic deodorant preparations, i.e., from about 0.125 to 1.0% of the finished product.

It will be evident that the novel composition of this invention is an antiperspirant in compact powder form comprising: (1) the ingredients of a compact powder, i.e., a face powder, (2) a cosmetically acceptable antiperspirant, and (3) a polyoxyethylene lauryl ether characterized by the presence of about 4 ($CH_2CH_2O$) units in the ether. The antiperspirant is preferably an aluminum salt, and even more particularly, the well known aluminum chlorohydroxide complex so extensively used in the antiperspirant art.

It will be understood that the foregoing description of the invention and the examples set forth are merely illustrative of the principles thereof. Accordingly, the appended claims are to be construed as defining the invention within the full spirit and scope thereof.

I claim:

1. An antiperspirant in compact powder form comprising: (1) the ingredients of a compact powder, (2) a hygroscopic antiperspirant, and (3) a polyoxyethylene lauryl ether characterized by the presence of about 4 ($CH_2CH_2O$) units in the ether.

2. An antiperspirant in compact powder form comprising: (1) the ingredients of a compact face powder, (2) aluminum chlorohydroxide complex, and (3) a polyoxyethylene lauryl ether characterized by the presence of about 4 (CH$_2$CH$_2$O) units in the ether.

3. A composition in accordance with claim 2 wherein component (1) comprises talc, titanium dioxide and zinc stearate in conventional proportions as present in a face powder.

4. A composition in accordance with claim 2 wherein component (2) is present in an amount of 10 to 25% by weight and component (3) is present in an amount of 1.5 to 5%.

5. A composition in accordance with claim 2 wherein component (2) is present in an amount of 10 to 15% by weight and component (3) is present in an amount of 2.5 to 3.5%.

6. A composition in accordance with claim 4 which also includes hexachlorophene in an amount of 0.125 to 1.0% by weight of the composition.

7. An antiperspirant in compact powder form of the following approximate composition:

| | Percent |
|---|---|
| Talc | 67.0 |
| Titanium dioxide | 2.2 |
| Zinc stearate | 3.5 |
| Iron oxide (cosmetic grade) | 1.8 |
| Aluminum chlorohydroxide complex | 16.0 |
| Mineral oil | 4.7 |
| Water | 1.8 |
| C$_{12}$H$_{25}$O(CH$_2$CH$_2$O)$_4$OH | 3.0 |

References Cited

UNITED STATES PATENTS

| 2,230,082 | 1/1941 | Montenier | 167—90 |
| 2,732,327 | 1/1956 | Teller | 167—90 |
| 2,814,584 | 11/1957 | Daley | 167—90 |
| 3,118,810 | 1/1964 | Vonkennel | 167—91 X |

FOREIGN PATENTS

| 1,163,826 | 5/1958 | France. |

OTHER REFERENCES

Sagarin: Cosmetics, Science and Technology, Interscience Publishers, New York, N.Y. (1957), pp. 228, 233 and 245.

Cosmetic Bulletin, "Brij Surfactants," Atlas Chemical Industries, Inc., Wilmington, Del. (1961), seven page pamphlet, especially pp. 1–4.

ALBERT T. MEYERS, *Primary Examiner.*

JULIAN S. LEVITT, *Examiner.*

VERA C. CLARKE, *Assistant Examiner.*